July 18, 1950 N. B. WALES 2,515,385
AUTOMATICALLY TIMED COFFEE MAKER
Filed May 28, 1948 2 Sheets-Sheet 1

INVENTOR.
Nathaniel B. Wales

July 18, 1950  N. B. WALES  2,515,385
AUTOMATICALLY TIMED COFFEE MAKER
Filed May 28, 1948  2 Sheets-Sheet 2

INVENTOR.
Nathaniel B. Wales

Patented July 18, 1950

2,515,385

UNITED STATES PATENT OFFICE 2,515,385

AUTOMATICALLY TIMED COFFEE MAKER

Nathaniel B. Wales, New York, N. Y., assignor to Industrial Patent Corporation, New York, N. Y.

Application May 28, 1948, Serial No. 29,821

2 Claims. (Cl. 219—43)

This invention relates to means and structure to automatically actuate the heater switch and thus determine the heating interval of a cooking device and in particular a brewing pot using an immersed type of heating element.

Percolating coffee makers using an immersed electrical heating element, especially those in which the element is surrounded by an insulated percolation chamber, rapidly transfer the heat generated by the element to the top of the coffee basket in the form of steam bubbles and heated water. This circulative action sets up a sharply defined vertical temperature gradient in the liquid contained in the vessel and advantage is taken of this temperature gradient to translate it into a time factor, or interval of brewing, as determined by the temperature of the skirt, or base, of the coffee pot itself, which is below the source of heat but which accurately reflects the temperature of the lowest stratification of the liquid brew therein.

By utilizing the skirt, or integral base, of the vessel as the point at which the differential expansion coefficient of my switch actuating means is applied the above outlined time interval factor is enhanced. I have found by actual operation that a degree of expansion in an approximately five inch diameter aluminum pot with a temperature rise of approximately 140 degrees effects a diametrical dilation of the skirt of five thousandths of an inch. Micro snap switches are available which only require two thousandths of an inch movement to operate, so that an effective and reliable adjustment tolerance exists.

One object of this invention is to achieve a low-cost, reliable actuating and timing system utilizing the coefficient of expansion of the base, or skirt of the pot, or vessel, to actuate the switch controlling the heating element therefor.

A further object is to devise a switch actuating system for cooking utensils wherein the force available from the expansible element is of such a magnitude as to be able to directly operate a standard type snap action switch in order to prevent arcing on the switch terminals as is experienced in a bimetallic actuated slow action switch.

Another object is to dispense with electric relays for actuating the main heating element switch or other secondary thermostatic heating circuits and the like.

Another object is to coordinate the expansion of the skirt, or base, of a brewing vessel having a high coefficient of expansion with a diametrical column spaced from and insulated by its position in respect to the vessel and having a smaller coefficient of expansion. The switch is positioned within this diametrical column. The components of the column of lesser coefficient of expansion are under a bias constant of a spring, reacting against the skirt of the vessel, to absorb all tolerance therein in order to accurately reflect the expansion differential between the two columns and thus actuate the switch.

A further object is to provide manual actuated means to vary as desired the brewing or cooking interval.

Further objects and pertinent details will be more specifically described and illustrated in the accompanying specifications and drawings in which similar numerals refer to similar parts:

Figure 1:
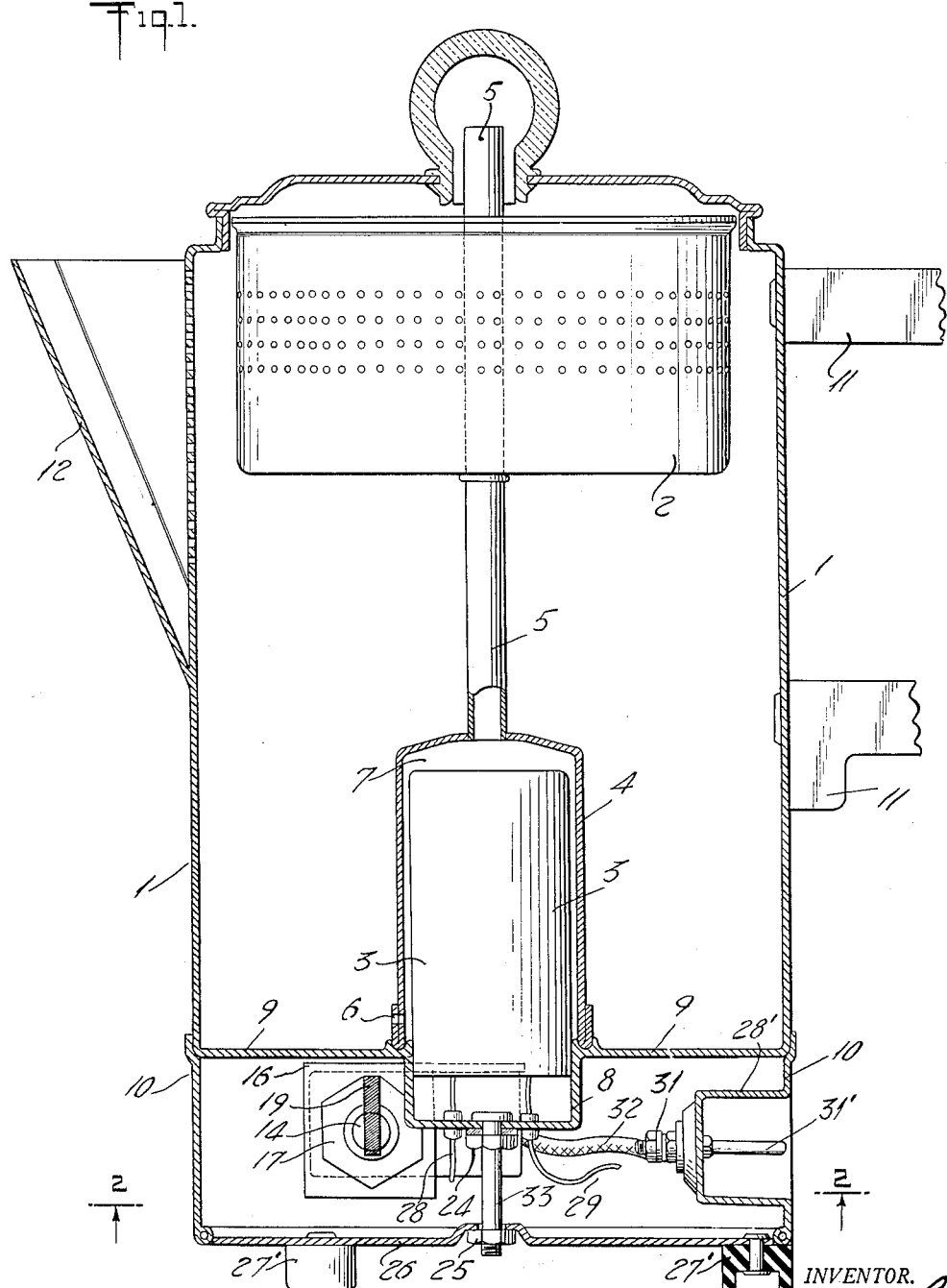
Figure 1 is an elevation in section on line 1—1 in Figure 2.

In Figure 1, numeral 1 is a cooking vessel specifically shown as a percolator type coffee pot having a conventional porous coffee container 2 and a submerged electric heater 3 around which fits a percolating cowl 4 secured to a tube 5 which extends through and above the container 2. An orifice 6 controls the water entry into the annulus 7 formed between the heater 3 and the cowl 4. The heater 3 is suitably sealed in recess 8 formed in the bottom of the vessel or pot 1. A cylindrical skirt or base 10 supports the pot 1 and may be suitably bonded or secured to the pot 1 in any well known manner. A handle 11 and a spout 12 are shown conventionally secured to pot 1.

An electric switch 13, preferably of the snap action type, has an actuating head 14 which extends through threaded sleeve 15 around which fits supporting strut 16 and which is held rigidly in place thereon by nut 17. Strut 16 is secured to skirt 10 by screws 18. An angulated lever 19 is secured at one end by machine screw 20 and nut 21, or in like rigid manner to the opposite wall of skirt 10 in respect to the position of strut 16 forming the attachment of switch 13 as previously described. It is to be noted that although lever 19 is securely attached to skirt 10 the wall of skirt 10 will readily flex sufficiently to permit lever 19 a degree of freedom for adjustment. It is evident a pivot could be substituted for the screw 20 and nut 21.

Figure 3:
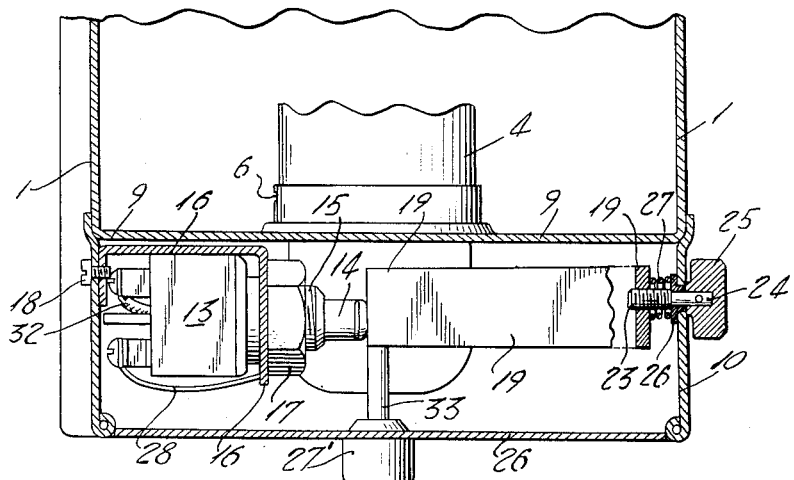
Figure 3 is an elevation in section taken on line 3—3 in Figure 2 showing the spring bias means to absorb tolerances.

The opposite end of lever 19 contacts switch actuator 14. A screw 23 is in threaded engagement with lever 19 at the point 22. The shank 24 of screw 23 is riveted to control knob 25, see Figure 3 and is journaled in sleeve 26 secured into the wall of skirt 10. Knob 25 is shown knurled for easy manual adjustment. A spring 27 is interposed under compression between lever 19 and the face of sleeve 26. The coordination of these components compels lever 19 to push inwardly on actuator head 14 of switch 13 as is indicated in the direction of arrow Y if knob 25 is rotated clockwise and lever 19 is moved in the opposite direction as indicated by arrow Z if knob 25 is rotated counterclockwise.

Figure 2:
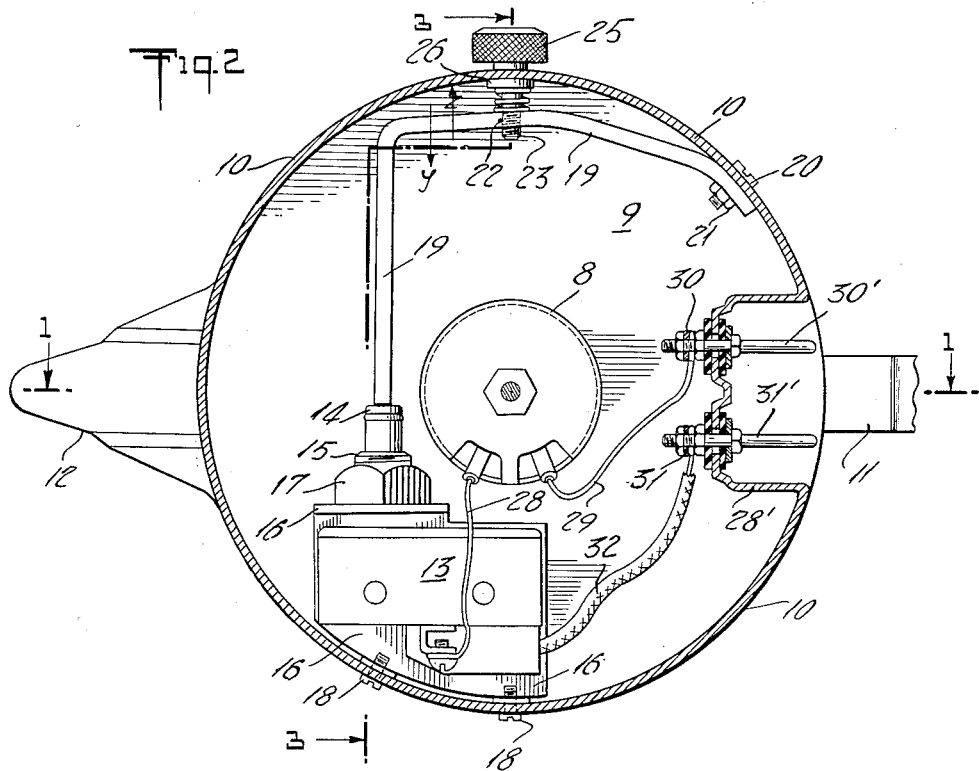
Figure 2 is a view looking upward in the direction of the arrows of line 2—2 in Figure 3.

The terminal leads 28 and 29 from heater 3 are connected to outlet terminals 30 and 31 which extend through skirt 10 into outlet recess 28' have male terminals 30' and 31' for a conventional plug. The lead 28 connects switch 13 into this circuit via wire 32 in order to dictate the energization of heater 3 by switch 13. The snap switch 13 is normally held closed by lever 19 through the adjustment of knob 25 when the temperature of the aluminum skirt 10 is at normal ambient temperature, see Figure 2. However, after an interval of percolator operation the heater 3 has raised the temperature of the liquid in aluminum pot 1 and thermal conduction from the temperature of the liquid in pot 1 heats the aluminum skirt or base 10 to a degree that its diametrical expansion in respect to the low coefficient of expansion of the components in the diametrical column composed of strut 16 and lever 19, which are so positioned as not to be in direct contact with the heated fluid in pot 1, is such as to permit the switch actuator 14 to move outwardly in respect to switch 13 and to permit the switch mechanism to snap over into an "off" position, thereby de-energizing heater 3. By adjusting knob 25 the diametrical column composed of strut 16, switch actuator head 14 and lever 19 is effectively varied in length in respect to the diameter of the skirt or base 10, whereby the skirt 10 must either expand more or less, as the case may be, to effect the necessary movement to actuate switch 13. The degree of compression on spring 27 is such as to exceed the force necessary to snap switch 13 over its neutral point. A stud 33 extending from the base of heater 3 is used to secure the base cover 26 to which suitable feet 27' are secured.

It has been found that strut 16, switch actuator head 14 and lever 19 may all be fabricated out of commercial steel which keeps production cost at a minimum.

Emphasis is laid on the fact that the essential switch movement is generated from the differential expansion rate of an aluminum or other high coefficient of expansion ring or annulus of metal which forms the skirt or base of the cooking vessel as compared to the diametrical column having a lower coefficient of thermal expansion.

This system is very reliable due to the ample forces available to operate the snap switch 3 and the accuracy of the micrometer type of manual adjustments.

What I desire to protect by United States Letters Patent is encompassed in the following claims:

1. In an automatic coffee maker comprising a pot, an electric heater therefor, a switch for controlling said heater, a supporting base secured to and in thermal-transfer relation with said pot, bimetallic thermostatic means to actuate said switch wherein said base is utilized as the high coefficient of thermal expansion element of said bimetallic means to move said switch from a normally "on" position to an "off" position when said base expands to a predetermined degree by its rise in temperature from its thermal relation with said pot.

2. In an automatic coffee maker comprising a pot, an electric heater therefor, a switch for controlling said heater, a supporting base secured to and in thermal-transfer relation with said pot, bimetallic thermostatic means to actuate said switch wherein said base is utilized as the high coefficient of thermal expansion element of said bimetallic means to move said switch from a normally "on" position to an "off" position when said base expands to a predetermined degree by its rise in temperature from its thermal relation with said pot, and manually controlled means to vary the actuation of said bimetallic thermostatic means whereby the time interval between said "on" and 'off" position of said switch may be regulated.

NATHANIEL B. WALES.

REFERENCES CITED

The following references are of record in the file of this patent:

UNITED STATES PATENTS

| Number | Name | Date |
|---|---|---|
| 1,907,199 | Hurxthal | May 2, 1933 |
| 2,076,096 | Samuels et al. | Apr. 6, 1937 |
| 2,112,731 | Bruning et al. | Mar. 29, 1938 |
| 2,194,118 | Graham | Mar. 19, 1940 |